United States Patent
Barley

(10) Patent No.: US 7,175,103 B1
(45) Date of Patent: Feb. 13, 2007

(54) FEED DISPENSER

(75) Inventor: Christopher B. Barley, Kerrville, TX (US)

(73) Assignee: WGI Innovations, Ltd., Kerrville, TX (US)

( * ) Notice: Subject to any disclaimer, the term of this patent is extended or adjusted under 35 U.S.C. 154(b) by 107 days.

(21) Appl. No.: 10/813,850

(22) Filed: Mar. 30, 2004

Related U.S. Application Data

(60) Provisional application No. 60/459,383, filed on Mar. 31, 2003.

(51) Int. Cl.
*B05B 17/00* (2006.01)
*A01C 15/00* (2006.01)

(52) U.S. Cl. .......................... 239/1; 239/667; 239/669; 239/682; 239/687; 239/650; 119/51.04; 119/51.11; 222/237

(58) Field of Classification Search ................ 239/664, 239/667, 668, 669, 682, 689, 687, 650; 119/51.04, 119/51.11, 57.91, 57.92; 222/237
See application file for complete search history.

(56) References Cited

U.S. PATENT DOCUMENTS

| | | | | |
|---|---|---|---|---|
| 4,166,581 A | * | 9/1979 | Hetrick | 239/683 |
| 5,368,192 A | * | 11/1994 | Ransom, II | 221/277 |
| 6,196,158 B1 | * | 3/2001 | Yang | 119/51.11 |
| 6,227,143 B1 | * | 5/2001 | Papkov | 119/51.11 |
| 6,367,417 B1 | * | 4/2002 | Gal et al. | 119/51.5 |

* cited by examiner

*Primary Examiner*—Dinh Q. Nguyen
(74) *Attorney, Agent, or Firm*—Hill Law Firm

(57) ABSTRACT

An improved feed dispenser is programmable to allow for a desired feeding schedule. When a feeding interval begins, a dispersion wheel begins operating. A separate spinner plate is used to block feed from the dispersion wheel, and begins operating to allow feed to the dispersion wheel only after a delay of several seconds after the dispersion wheel begins operation. In addition, the dispersion wheel is operated for another period of several seconds after the spinner plate ceases operation in order to clear the mechanism and prevent blockage.

16 Claims, 2 Drawing Sheets

FEED DISPENSER

CROSS-REFERENCE TO RELATED APPLICATION

The present application claims priority from U.S. Provisional Application No. 60/459,383, filed 31 Mar. 2003, the entirety of which is hereby incorporated by reference hereinto.

BACKGROUND OF THE INVENTION

1. Field of the Invention

The present invention relates generally to feeder equipment, and more specifically to a wide dispersal animal feeder.

2. Description of the Prior Art

As known in the prior art, it is sometimes desirable to provide a feeder device that widely disperses animal feed over a relatively broad area. One example of a use for this type of feeder is to provide food to fish. A feeder, resting on shore or otherwise near the water is used to disperse fish food over the surface of the water. Similar feeders provide food, usually in pellet form, to various types of wildlife.

Presently used feeder equipment has a number of drawbacks. Programming the equipment to operate on a desired feeding schedule is often not possible, and the feeding schedule must be changed to accommodate the feeder. Also, previously available feeders tend to jam with feed, particularly if it becomes moistened in the feeder.

It would be desirable to provide a feeder that can be flexibly programmed in order to allow feeding at a desired schedule. It would also be desirable for such a feeder to be designed in a manner that minimizes problems in operation caused by jamming of the feed in the feeder mechanism.

SUMMARY OF THE INVENTION

In accordance with the present invention, an improved feed dispenser is programmable to allow for a desired feeding schedule. When a feeding interval begins, a dispersion wheel begins operating. A separate spinner plate is used to block feed from the dispersion wheel, and begins operating to allow feed to the dispersion wheel only after a delay of several seconds after the dispersion wheel begins operation. In addition, the dispersion wheel is operated for another period of several seconds after the spinner plate ceases operation in order to clear the mechanism and prevent blockage.

BRIEF DESCRIPTION OF THE DRAWINGS

The following description is a preferred embodiment of the invention, and is used for illustrative purposes. The invention will be better understood by the following description taken together with the drawings, in which.

DETAILED DESCRIPTION OF THE INVENTION

As will be appreciated by those skilled in the art, the following description of a preferred embodiment is illustrative rather than limiting. Additional features may be added to a feed device without changing the nature of the invention, and various alternative design details will become apparent to those skilled in the art.

Figure 1:
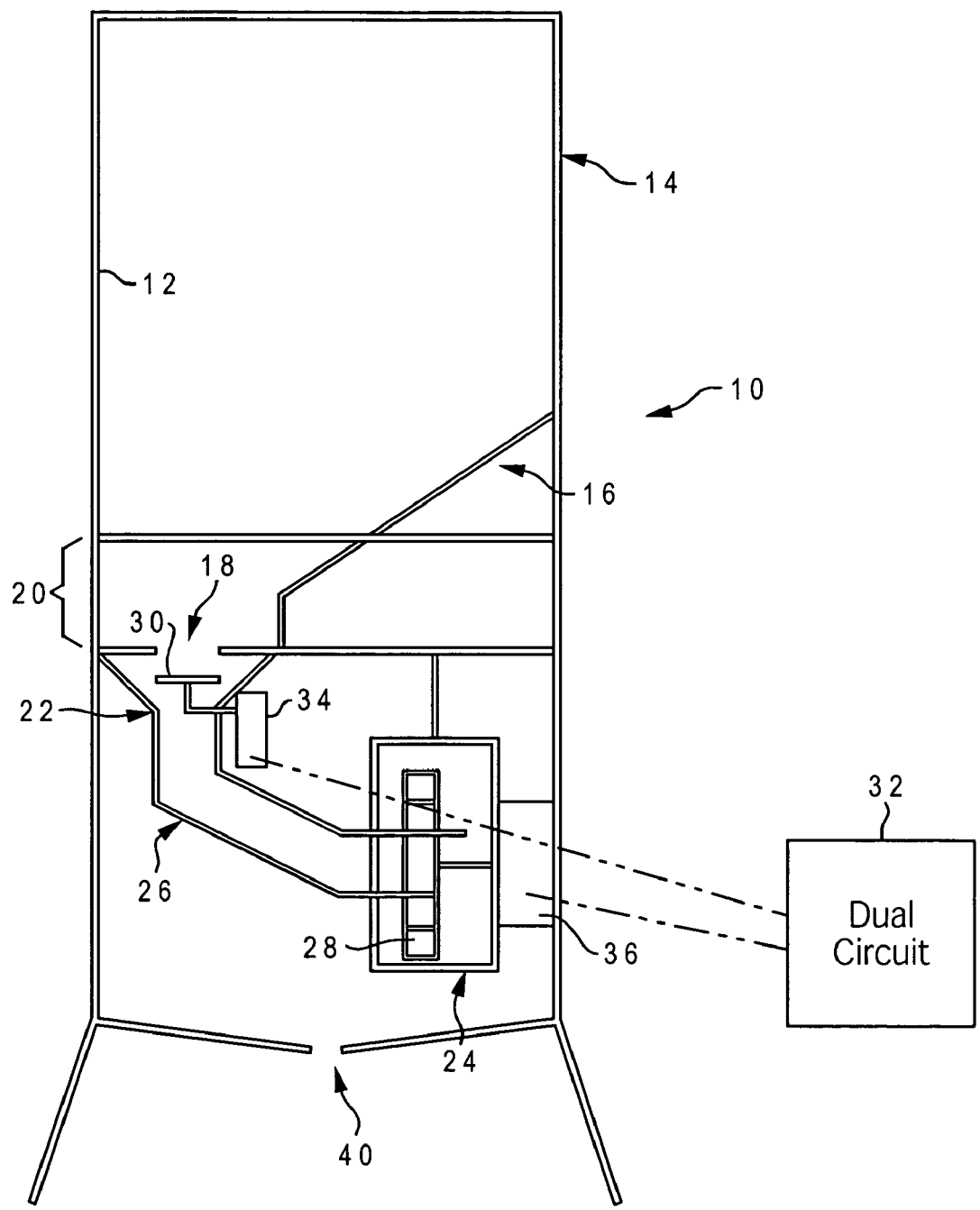
FIG. 1 is a schematic cross section of a preferred embodiment of the invention.

Referring to FIG. 1, a partially cut-away view of a preferred hopper 10 is disclosed. The hopper unit 10 has a modified plan, so that the funnel is offset and sloped on only three sides. Sidewall 12 is vertical while the other three sides have sloped lower portions. Right side wall 14 has a sloped lower portion 16 to direct feed pellets toward opening 18. The front and back walls, parallel to the plane of the Figure, each have lower sloped portions 20 to likewise direct feed pellets toward opening 18.

A spinner plate mechanism 22 is located slightly below opening 18 in the funnel of the hopper 10, and the hopper 10 is connected to a lower dispersal unit 24 through a funnel system 26. The lower dispersal unit 24 includes a relatively high speed, vertically mounted, spinning paddle wheel 28 that throws feed pellets out through an opening (not shown) in the front of the feeder unit. The spinner plate mechanism 22 operates to allow feed to leave the hopper 10 and travel through the funnel system 26 to the lower dispersal unit 28 only when the spinner plate 30 operates. In other words, when the spinner plate 30 is stopped, the opening 18 is blocked; when the spinner plate 30 spins, feed is allowed to drop into the funnel system 26.

A dual electronic control circuit 32 includes a programmable timer, and operates the spinner plate mechanism 22 and lower dispersal unit 28. Both the spinner plate mechanism 22 and lower dispersal unit 28 use electric motors, preferably a 6 volt motor 34 for the spinner plate 30 that operates at a reduced rate, and a 12 volt motor 36 for the paddle wheel 28 that operates at full capacity. Operation of the device is therefore completely controlled by the controller circuitry 32. Preferably, the paddle wheel 28 spins at a rate exceeding approximately 2000 rpm in order to disperse the feed pellets. The spinner plate 30 preferably spins as a slower rate so that feed is provided to the paddle wheel 28 at a measured rate.

Control circuit 32 is preferably a programmable controller programmed to operate in accordance with the following description. It is user programmable to operate multiple times during a day, with six or eight separate feeding cycles being common. The duration of each feeding cycle is also set by the user. In addition, the controller 32 is programmed to operate the spinner plate 30 and paddle wheel 28 separately, as described below, in order to provide operating characteristics for the device. The timing of operation for the spinner 30 and paddle wheel 28 are not normally under user control, but if desired can be made so in order to accommodate unusual circumstances.

The device functions as follows. The hopper 10 is filled with some type of pellet feed to a desired level. The timer of the control circuit 32 is programmed to define the number of times per day the feeder is to disperse feed, and for the duration of each feeding event. For example, the timer can be programmed to disperse feed between one and eight times per day, and each feeding session can have, for example, a duration of between 1 and 90 seconds.

Once this information has been programmed in, the feeder is left to run unattended. Each time the timer indicates that the time for a feeding session has arrived, the paddle wheel mechanism 24 begins rotating the paddle wheel 28 in order for it to achieve full rotational speed. This happens in less than approximately 4 seconds.

After a 4 second delay has occurred, allowing the paddle wheel 28 to come up to speed, the spinner plate mechanism 22 is engaged for the duration set on the timer. Operation of the spinner plate 30 causes feed to drop through the funnel system 26 and be dispersed by the paddle wheel 28. Once the runtime is expired, the spinner plate mechanism 22 stops operating, again blocking flow of feed pellets out of the hopper 10.

After the spinner plate 30 stops rotating, the paddle wheel mechanism 24 continues to operate for a short period of time to ensure that the funnel system 26 and lower dispersal unit are completely cleared of pellet feed. In the preferred embodiment, a 4 second additional runtime is sufficient to ensure that all feed is cleared from the mechanism. At this time, the cycle is complete, and the timer shuts down the device to await the next dispersal event.

Because water or condensation can cause the feed to swell up and jam parts of the system, drainage holes 40 are provided at several locations, and particularly in the lower dispersal unit, to ensure that any water that reaches the interior of the device, or condensation that occurs, is drained out through the bottom of the device. The continued running of the paddle wheel dispersal unit 24 for a short period of time after the feeding of pellets ceases also ensures that pellets are not left behind in the system to absorb water and block operation in the future.

Figure 2:
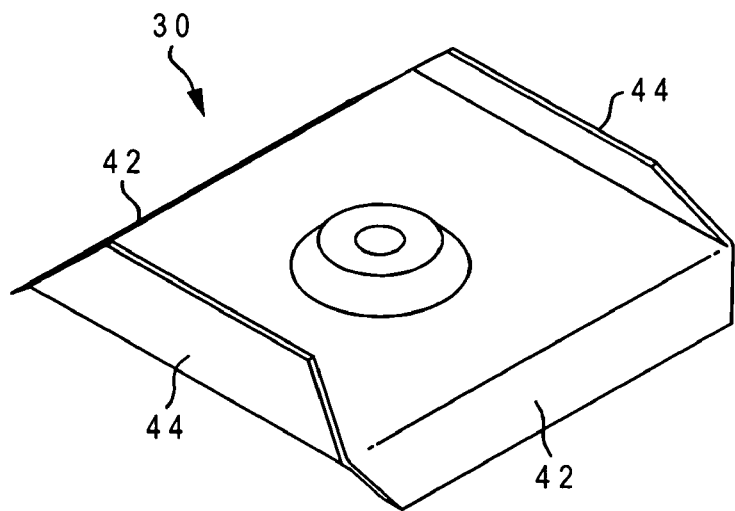
FIG. 2 is a perspective view of a preferred spinner plate.

Referring to FIG. 2, the diagram illustrates a preferred shape for the spinner plate 30. The spinner plate 30 is mounted with a vertical axis, and rotated by an electric motor 24 as previously described. As shown in the drawing, the spinner plate 30 has two edges 42, 44 that are folded downwardly, and two edges 46, 48 that a folded upwardly. Folding of the edges in this manner causes a certain amount of agitation of feed pellets resting on the plate after they come through the hopper. However, the plate is mounted close enough to the opening 18 at the bottom of the hopper unit that, when the plate is motionless, the flow of pellets is blocked. The distance between a spinner plate and the opening can be adjusted to be appropriate for the size of the feed pellets being used. In general, larger pellets will require the spinner plate mechanism 22 to be lowered, while smaller pellets will require the spinner plate 30 to be raised in order to be closer to the opening.

It will be appreciated by those skilled in the art that numerous other designs of the spinner plate can be used. The only requirement is that the spinner plate operates to block the opening and prevent the flow of feed pellets when it is not rotating, and allow feed pellets to be passed to the lower dispersal unit when it rotates.

Figure 3:
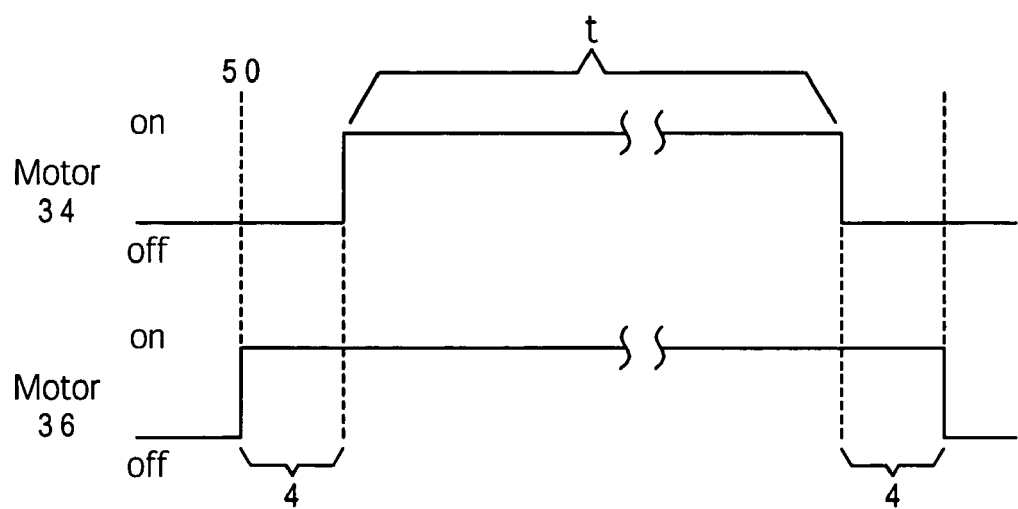
FIG. 3 is a timing diagram showing operation of a preferred control circuit.

FIG. 3 is a timing diagram showing typical functioning of the device during a single feeding cycle. The cycle begins at time 50, at which time controller 32 starts motor 36, which drives paddle wheel 28. The paddle wheel comes up to speed over a delay of a few seconds. After an appropriate delay, shown here as 4 seconds, motor 34 begins operation. The delay may be varied depending on the characteristics of the motor 36, but four seconds is sufficient in most cases.

When motor 34 begins operation, feed pellets begin moving through the system. Motor 34 stays on for a feed period programmed by the user, shown in the Figure as time t. Once duration t has expired, motor 34 is turned off, and feed pellet flow ceases from the hopper. However, motor 36 continues operation for another four seconds in order to clear the device of pellets. As before, this delay can be changed to another value of needed to ensure complete clearance of pellets. After the expiration of this second delay, motor 36 is turned off, and the cycle is complete.

Various changes can be made to the described feed device, as will be appreciated by those skilled in the art. Many of the details of the physical mechanism can be changed as necessary to suit particular applications.

The use of two motors as described, rather than using a solenoid driven gate to allow feed pellets to drop into the funnel system, helps eliminate jamming of pellets in the system. The spinner plate allow pellets to be dropped, but is not easily susceptible to jamming. In addition, the timing of operation of the paddle wheel motor relative to operation of the spinner motor also helps endure that excess feed pellets will be cleared from the device. This prevents most of the problems caused by pellets remaining in the device after the feeding cycle and causing jamming problems for later cycles.

While the invention has been shown in only one of its forms, it is not thus limited but is susceptible to various changes and modifications without departing from the spirit thereof.

What is claimed is:

1. An improved feeder apparatus, comprising:
   a storage hopper having a lower opening, the storage hopper adapted to hold a volume of feed pellets;
   a spinner plate mounted below the storage hopper lower opening, wherein the spinner plate is mounted on a vertical shaft, wherein feed pellets are allowed to drop below the spinner plate when the spinner plate is rotating, and wherein feed pellets are blocked from dropping below the spinner plate when the spinner plate is not rotating;
   a first motor coupled to the spinner plate shaft, wherein the first motor, when energized, causes the spinner shaft and spinner plate to rotate about an axis defined by the shaft;
   a paddle wheel mounted on a shaft, wherein the paddle wheel is adapted to throw feed pellets away from the feeder apparatus when rotated about the paddle wheel shaft;
   a second motor connected to the paddle wheel shaft, wherein the second motor, when energized, causes the paddle wheel shaft and paddle wheel to rotate about an axis defined by the paddle wheel shaft, wherein the paddle wheel rotates at a relatively high rpm relative to the spinner plate;
   a funnel system having a first opening below the spinner plate for catching feed pellets, and having a second opening allowing feed pellets to drop into the paddle wheel; and
   a controller connected to the first and second motors for selectively energizing the first and second motors.

2. The improved feeder apparatus of claim 1, wherein the first motor operates at a relatively low rate of speed relative to the second motor.

3. The improved feeder apparatus of claim 1, wherein the spinner plate comprises a substantially square planar plate having tabs along each edge folded at an angle compared to the plane of the plate, wherein two of the tabs, located on opposite edges, are folded up, while the remaining two edges are folded down.

4. The improved feeder apparatus of claim 1, wherein the controller operates to energize and de-energize the first and second motors to define a feeding cycle, and wherein the second motor is energized before the first motor to begin a feeding cycle, and the second motor is de-energized after the first motor to end a feeding cycle.

5. The improved feeder apparatus of claim 4, wherein the second motor is energized approximately 4 seconds before the first motor, and wherein the first motor is de-energized approximately 4 seconds before the second motor.

6. The improved feeder apparatus of claim 1, wherein the controller defines a selected number of feeding cycles during each day, with each feeding cycle having a selected duration during which feed is dispersed.

7. The improved feeder apparatus of claim 6, wherein the controller operates to energize and de-energize the first and second motors during each feeding cycle, and wherein the second motor is energized before the first motor to begin each feeding cycle, and the second motor is de-energized after the first motor to end each feeding cycle.

8. The improved feeder apparatus of claim 7, wherein the second motor is energized approximately 4 seconds before the first motor, and wherein the second motor is de-energized approximately 4 seconds after the first motor.

9. The improved feeder apparatus of claim 7, wherein both the first and second motors remain energized for the duration of each feeding cycle.

10. A method of dispersing feed pellets, comprising the steps of:

providing a plurality of feed pellets in a hopper;

rotating a spinner plate, located below an opening in a bottom of the hopper, to cause feed pellets to fall from the hopper;

diverting the fallen feed pellets to a paddle wheel; and rotating the paddle wheel at a high rate of speed sufficient to disperse the pellets.

11. The method of claim 10, wherein the spinner plate and paddle wheel are rotated for a selected period of time to define a feeding cycle.

12. The method of claim 11, wherein, for a feeding cycle, the spinner plate begins rotation after the paddle wheel, and wherein the paddle ceases rotation after the spinner plate.

13. The method of claim 12, wherein the spinner plate begins rotation approximately four seconds after the paddle wheel, and wherein the paddle wheel ceases rotation approximately four seconds after the spinner plate.

14. The improved feeder apparatus of claim 1, wherein the paddle wheel shaft is substantially horizontal, whereby the paddle wheel rotates in a substantially vertical plane.

15. The method of claim 10, wherein the paddle wheel operates in a substantially vertical plane.

16. The method of claim 10, wherein the spinner plate operates by rotating in a substantially horizontal plane.

* * * * *